United States Patent
Kim

(10) Patent No.: US 7,596,151 B2
(45) Date of Patent: Sep. 29, 2009

(54) SYSTEM AND METHOD FOR DISCOVERING PATH MTU IN AD HOC NETWORK

(75) Inventor: Hyeong-seok Kim, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 884 days.

(21) Appl. No.: 10/834,022

(22) Filed: Apr. 29, 2004

(65) Prior Publication Data
US 2004/0218550 A1    Nov. 4, 2004

(30) Foreign Application Priority Data
May 2, 2003    (KR) ............... 10-2003-0028348

(51) Int. Cl.
*H04J 3/16* (2006.01)

(52) U.S. Cl. .............. 370/468; 370/235; 370/338; 370/400

(58) Field of Classification Search ......... 370/351, 370/352, 353, 354, 355, 356, 400, 338, 254, 370/235, 468, 465, 470; 709/238, 242, 243, 709/248, 252, 254
See application file for complete search history.

(56) References Cited

U.S. PATENT DOCUMENTS

| | | | |
|---|---|---|---|
| 5,425,023 A | | 6/1995 | Haraguchi et al. |
| 5,959,974 A | * | 9/1999 | Badt et al. ............ 370/233 |
| 6,304,556 B1 | * | 10/2001 | Haas ................... 370/254 |
| 7,177,295 B1 | * | 2/2007 | Sholander et al. ....... 370/338 |
| 7,349,339 B2 | * | 3/2008 | Meckelburg et al. ..... 370/235 |
| 7,451,227 B2 | * | 11/2008 | Lee et al. ............. 709/232 |
| 2003/0179742 A1 | * | 9/2003 | Ogier et al. ........... 370/351 |
| 2003/0223431 A1 | * | 12/2003 | Chavez et al. ......... 370/395.42 |
| 2004/0022223 A1 | * | 2/2004 | Billhartz ............... 370/338 |
| 2004/0090922 A1 | * | 5/2004 | Jason et al. ........... 370/252 |

FOREIGN PATENT DOCUMENTS

| | | |
|---|---|---|
| JP | 11-168492 A | 6/1999 |
| JP | 11168492 A * | 6/1999 |
| JP | 11-331231 A | 11/1999 |
| WO | WO 01/41378 A1 | 6/2001 |
| WO | WO 02/102000 A2 | 12/2002 |

OTHER PUBLICATIONS

Peng Wei et al., "An Efficient Broadcast Protocol for Mobile Ad Hoc Networks", School of Computer Science, national University of Defense Technology, vol. 22, No. 5, 2000.

* cited by examiner

*Primary Examiner*—Patrick N. Edouard
*Assistant Examiner*—Anthony S Addy
(74) *Attorney, Agent, or Firm*—Sughrue Mion, PLLC

(57) ABSTRACT

A system and method of discovering a path MTU in an ad hoc network, including updating a MTU table based on addresses and MTU values of nodes included in hello messages received periodically among the nodes, inserting the addresses and MTU values of nodes stored in the MTU table into each of the hello messages and periodically transmitting the resultant hello message, and extracting MTU values of nodes present on a transmission path from the MTU table and determining one of the extracted MTU values as a path MTU value upon transfer of a data packet.

10 Claims, 9 Drawing Sheets

| Address | MTU |
|---------|-----|
| B | 7 |
| C | 8 |
| D | 5 |
| E | 5 |
| F | 4 |

SYSTEM AND METHOD FOR DISCOVERING PATH MTU IN AD HOC NETWORK

This application claims the priority of Korean Patent Application No. 2003-28348 filed on May 2, 2003, in the Korean Intellectual Property Office, the disclosure of which is incorporated herein by reference.

BACKGROUND OF THE INVENTION

1. Field of Invention

A system and method consistent with the present invention is operable to discover a path maximum transfer unit (MTU) in an ad hoc network, and more particularly, to a system and method operable to discover a path MTU in an ad hoc network, wherein the path MTU can be discovered between a sending node and a receiving node.

2. Description of the Related Art

An ad hoc network is a collection of wireless mobile hosts forming a temporary network without the aid of any centralized administration and standard support services. The ad hoc network is not equipped with any fixed control devices for providing a connection to a backbone host or other mobile host. In the ad hoc network, each mobile host acts as a router to forward a packet from one mobile host to the other.

As shown in FIG. 1, in the ad hoc network, since a variety of terminals with a wireless communication function communicate with one another, the respective terminals have various values of MTU that are defined as the maximum size of a packet that can be transmitted from or received by each terminal.

Since the respective terminals have various MTU values in the ad hoc network as mentioned above, it is necessary to discover a path MTU that shows the maximum size of a data packet that can be transmitted or received between a sending node and a receiving node without fragmentation of the packet in order to transfer a packet by using the discovered path MTU.

Each node is a terminal present in the network, and may be implemented by a notebook computer, a personal digital assistant (PDA) or the like.

Hereinafter, a method of discovering a path MTU in an ad hoc network in the related art will be described with reference to FIGS. 2 to 4.

First, it is assumed that there are four nodes A, B, C and D in the ad hoc network. MTU is defined as the maximum size of a packet which can be transmitted from or received by each node. Nodes A, B, C and D have MTU values of 6, 5, 4 and 7, respectively as shown in FIG. 2.

Under this assumption, if node A intends to transmit a data packet to node D, node A first transmits a data packet with the size of 6 to the next node B in order to transmit the data packet to node D along a transmission path determined through a routing table, as shown in FIG. 2, because node A has the MTU value of 6 as mentioned above. However, since node B has the MTU value of 5, node B cannot receive and process the data packet transmitted from node A.

Thus, to notify node A that node B cannot receive and process the data packet due to the large size of the transmitted data packet, node B adds the MTU value of 5 to a packet-size notifying message (in this case, a "Packet Too Big" message) among messages of ICMPv6 (Internet Control Message Protocol version 6), and sends back the resultant message to node A.

From the MTU value included in the message received from node B, node A recognizes that the path MTU value should be reduced to 5 in order to send the data packet to node D, which is a receiving node, without fragmentation of the data packet.

Consistent with an exemplary embodiment, node A reduces the size of the data packet to 5 and resends the reduced data packet to node B. Node B then in turn sends the data packet to the next node C, as shown in FIG. 3. However, because the node C has the MTU value of 4, node C cannot receive and process the data packet transmitted from node B.

Therefore, to notify node A, which is the sending node, that node C cannot receive and process the data packet due to its large size, node C sends a packet-size notifying message with the MTU value of 4 contained therein to node A via node B.

From the MTU value included in the message received from node C via node B, node A recognizes that the path MTU should be reduced to 4 in order to send the data packet to node D, which is the receiving node, without fragmentation of the data packet.

Thereafter, node A reduces the size of the data packet to 4 and resends the reduced data packet to node B that in turn sends the data packet to node D via node C, as shown in FIG. 4.

As described above, when a data packet is transmitted from a sending node to a receiving node in an ad hoc network in the related art, if each node existing on a transmission path receives a data packet of a size exceeding the maximum size of data packet that the node itself can transmit or receive, the node notifies the sending node that the received data packet is too large to process, using the packet-size notifying message of the ICMPv6 messages.

Then, the sending node, which sent the data packet toward the receiving node and has received the packet-size notifying message from an intermediate node, changes its path MTU value to the MTU value contained in the packet-size notifying message and resends the data packet based on the changed path MTU value. The sending node should repeat such a process until the sending node can send the data packet without fragmentation thereof to the receiving node.

Therefore, there are problems in that data transfer to a receiving node is delayed until a sending node recognizes a correct path MTU, and consumption of wireless resources is increased due to retransmission of packet-size notifying messages and data, thereby resulting in deterioration of the performance of a network.

SUMMARY OF THE INVENTION

The present invention addresses the aforementioned problems. An aspect of the present invention is to provide a system and method for discovering a path MTU in an ad hoc network, wherein a path MTU between a sending node and a receiving node can be discovered from a MTU table constructed by exchanging hello messages with MTU information added thereto.

Consistent with an aspect of the present invention, there is provided a system for discovering a path MTU in an ad hoc network, comprising a path MTU-determining unit for extracting MTU values of nodes present on a transmission path from a MTU table constructed of MTU values of nodes present in the network by using hello messages, and determining one of the extracted MTU values as a path MTU value.

In an exemplary embodiment, the system further comprises a MTU table-managing unit for updating the MTU table based on addresses and MTU values of nodes included in the hello messages received periodically and a hello message-transmitting unit for inserting the addresses and MTU values of nodes stored in the MTU table into each of the hello messages, and periodically transmitting the resultant hello message.

Consistent with another aspect of the present invention, a method of discovering a path MTU in an ad hoc network, comprising the path MTU-determining step of extracting MTU values of nodes present on a transmission path from a MTU table constructed of MTU values of nodes present in the network by using hello messages, and determining one of the extracted MTU values as a path MTU value.

In an exemplary embodiment, the method further comprises the MTU table-updating step of updating the MTU table based on addresses and MTU values of nodes included in the hello messages received periodically, and the hello message-transmitting step of inserting the addresses and MTU values of nodes stored in the MTU table into each of the hello messages, and periodically transmitting the resultant hello message.

In an exemplary embodiment, the path MTU-determining step comprises if there are data to be transmitted, determining the transmission path based on a routing table, extracting MTU values of the nodes present on the transmission path from said MTU table, detecting the smallest MTU value of the extracted MTU values, and determining the detected MTU value as the path MTU value established from a sending node to a receiving node.

In an exemplary embodiment, the MTU table-updating step comprises analyzing the received hello messages and extracting the addresses and MTU values of both the nodes, transmitting the hello messages and the nodes present in the network, comparing the extracted addresses and MTU values with the addresses and MTU values of nodes stored in the MTU table, and determining whether there are any addresses and MTU values of nodes that should be added or changed and if it is determined that there are addresses and MTU values of nodes which should be added or changed, updating the MTU table based on the extracted addresses and MTU values.

In an exemplary embodiment, the hello message-transmitting step comprises recording the addresses and MTU values of the nodes transmitting the hello messages in a sending node field of each of the hello messages, recording the addresses and MTU values of the nodes present in the network in the node field by referring to the MTU table, and transmitting the generated hello messages to adjacent nodes.

BRIEF DESCRIPTION OF THE DRAWINGS

The above and other aspects and features of the present invention will become apparent from the following description of exemplary embodiments given in conjunction with the accompanying drawings, in which.

DETAILED DESCRIPTION OF THE INVENTION

Hereinafter, a system and method for discovering a path MTU in an ad hoc network consistent with exemplary embodiments of the present invention will be described in detail with reference to the accompanying drawings.

Figure 1:
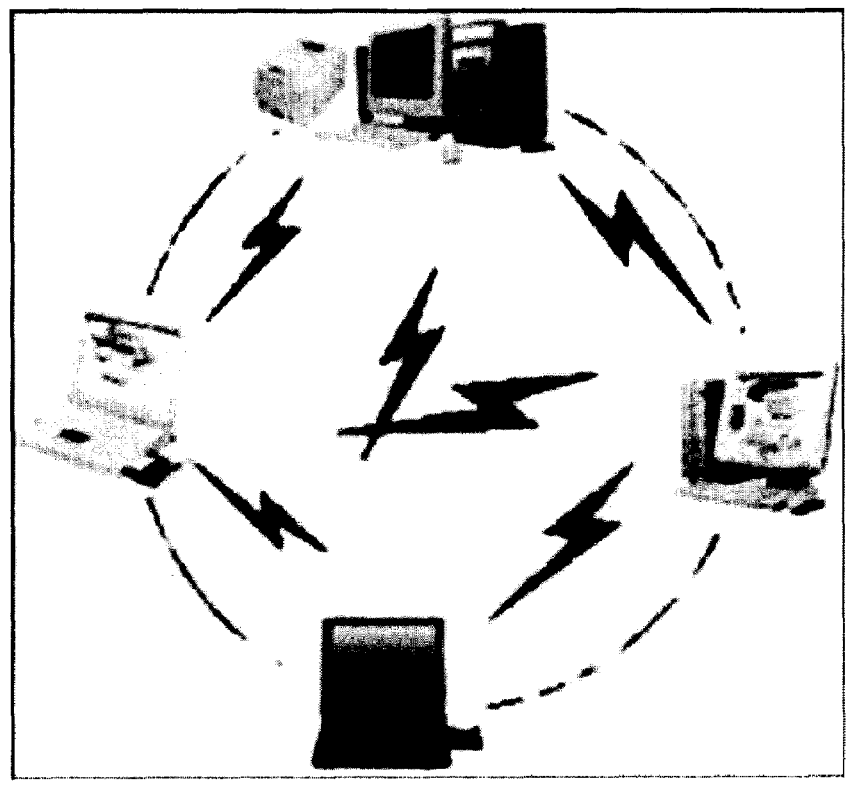
FIG. 1 is an exemplary view showing a configuration of an ad hoc network in the related art.
Figure 2:
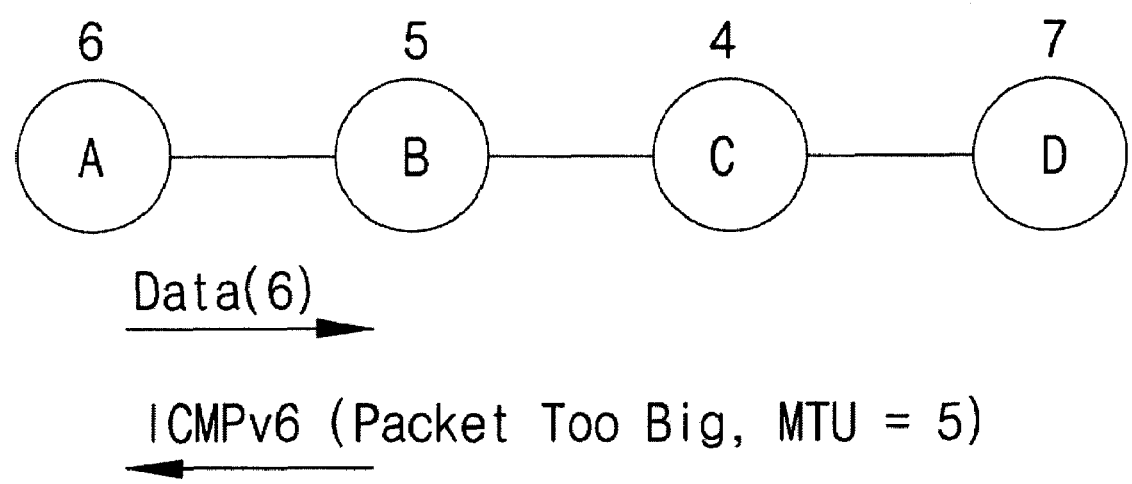
FIGS. 2 to 4 are views explaining a conventional method of discovering a path MTU in an ad hoc network.
Figure 3:
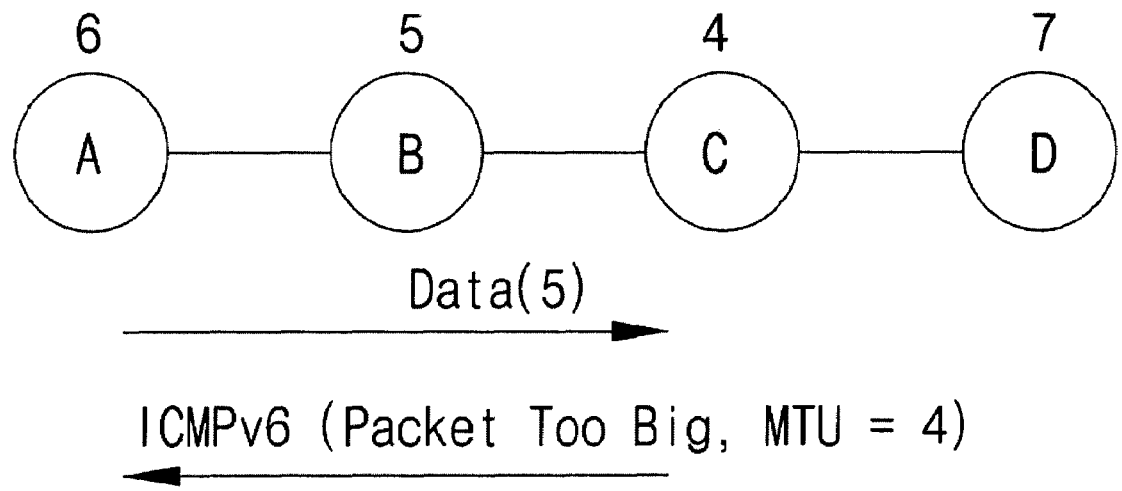
Figure 4:
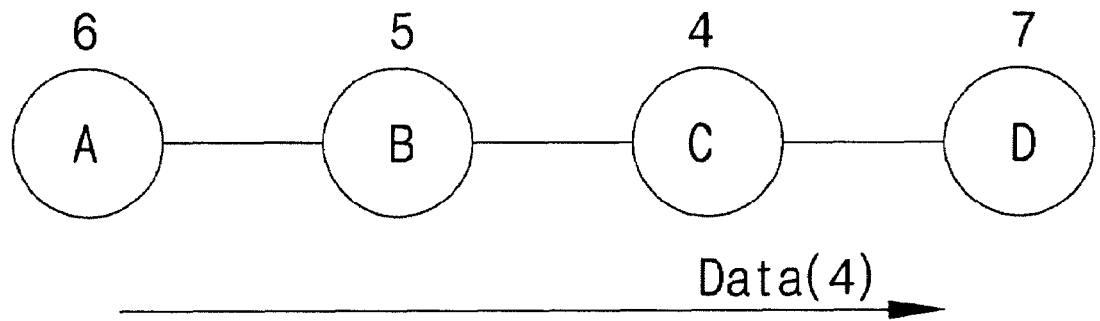
Figure 5:
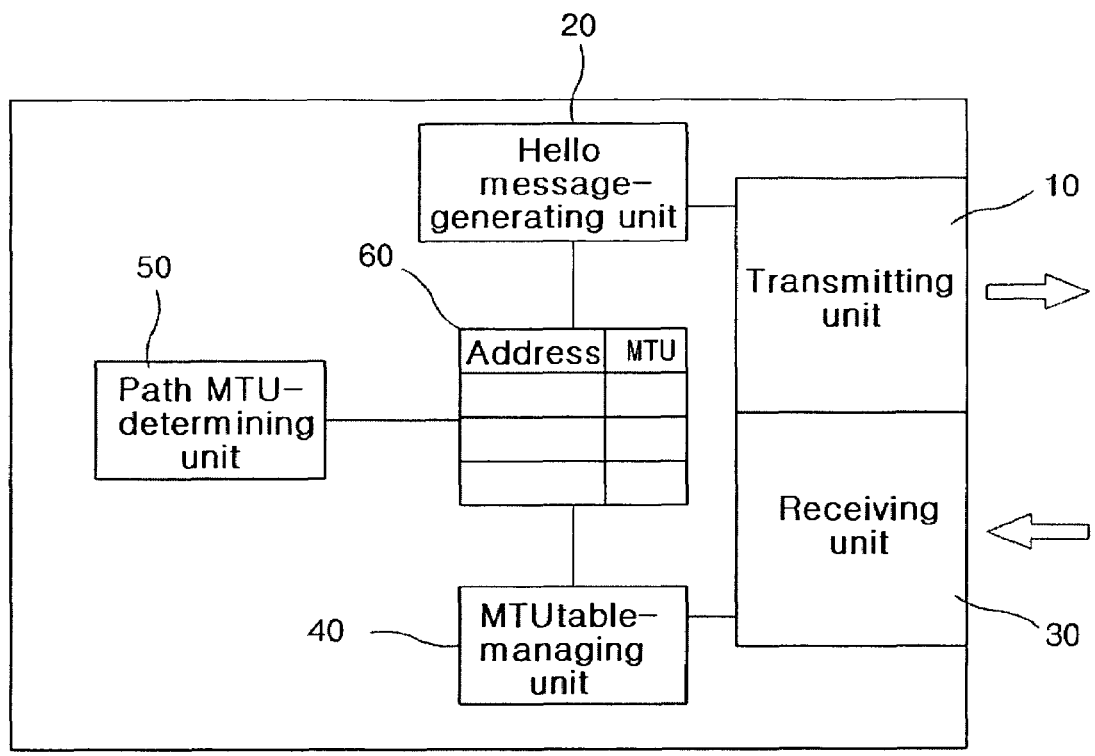
FIG. 5 is a block diagram showing a configuration of a system for discovering a path MTU in an ad hoc network consistent with an embodiment of the present invention.

FIG. 5 is a block diagram showing a configuration of a system for discovering a path MTU in an ad hoc network consistent with an embodiment of the present invention. The system comprises a transmitting unit 10, a hello message-generating unit 20, a receiving unit 30, a MTU table-managing unit 40, a MTU table 60 and a path MTU-determining unit 50.

The transmitting unit 10 processes data to be transmitted and transmits them to a relevant node.

The hello message-generating unit 20 inserts addresses and MTU values of nodes stored in the MTU table 60 into a hello message generated periodically and transmits the resultant hello message through the transmitting unit 10 to adjacent nodes in the network.

The receiving unit 30 receives data transmitted from nodes in the network.

The MTU table-managing unit 40 compares addresses and MTU values of nodes included in a hello message, which has been received through the receiving unit 30, with the addresses and MTU values of nodes stored in the MTU table 60. If it is confirmed from the comparison that there are any addresses and MTU values of nodes to be added or changed, the MTU table-managing unit 40 updates the MTU table 60 based on the addresses and MTU values of nodes included in the received hello message.

If there is data to be transmitted, the path MTU-determining unit 50 extracts MTU values of nodes on the transmission path, which is determined by referring to a routing table (not shown), from the updated MTU table 60 and determines the smallest MTU value of the extracted MTU values as a path MTU value.

Figure 6:
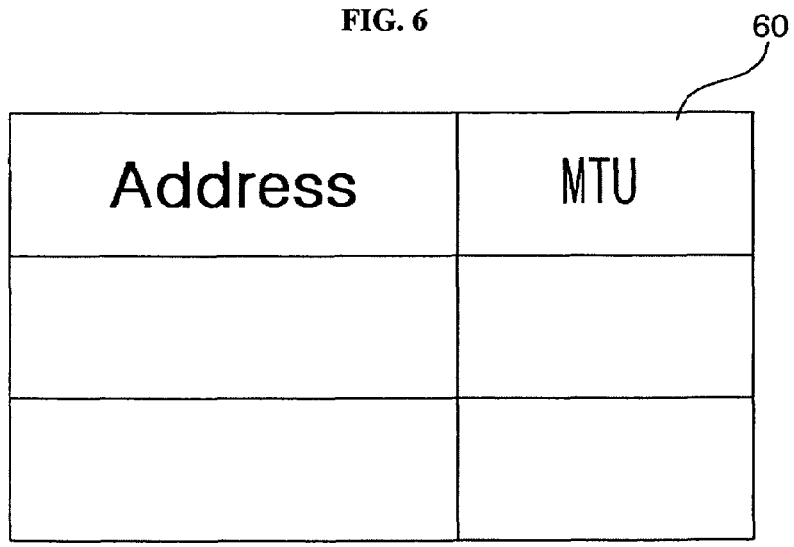
FIG. 6 is a view showing the structure of a MTU table applied to the present invention.

The MTU table 60 is provided in each node present in the network, and stores therein addresses and MTU values (the maximum sizes of data packets that can be transmitted from or received by nodes) of the nodes present in the network, in a one-to-one correspondence relationship, as shown in FIG. 6.

A MTU table 60 of a node may optionally comprise an address and MTU value of the node. However, in this embodiment of the present invention, it is assumed that the MTU table 60 does not include the address and MTU value of the node that the table belongs to.

Figure 7:
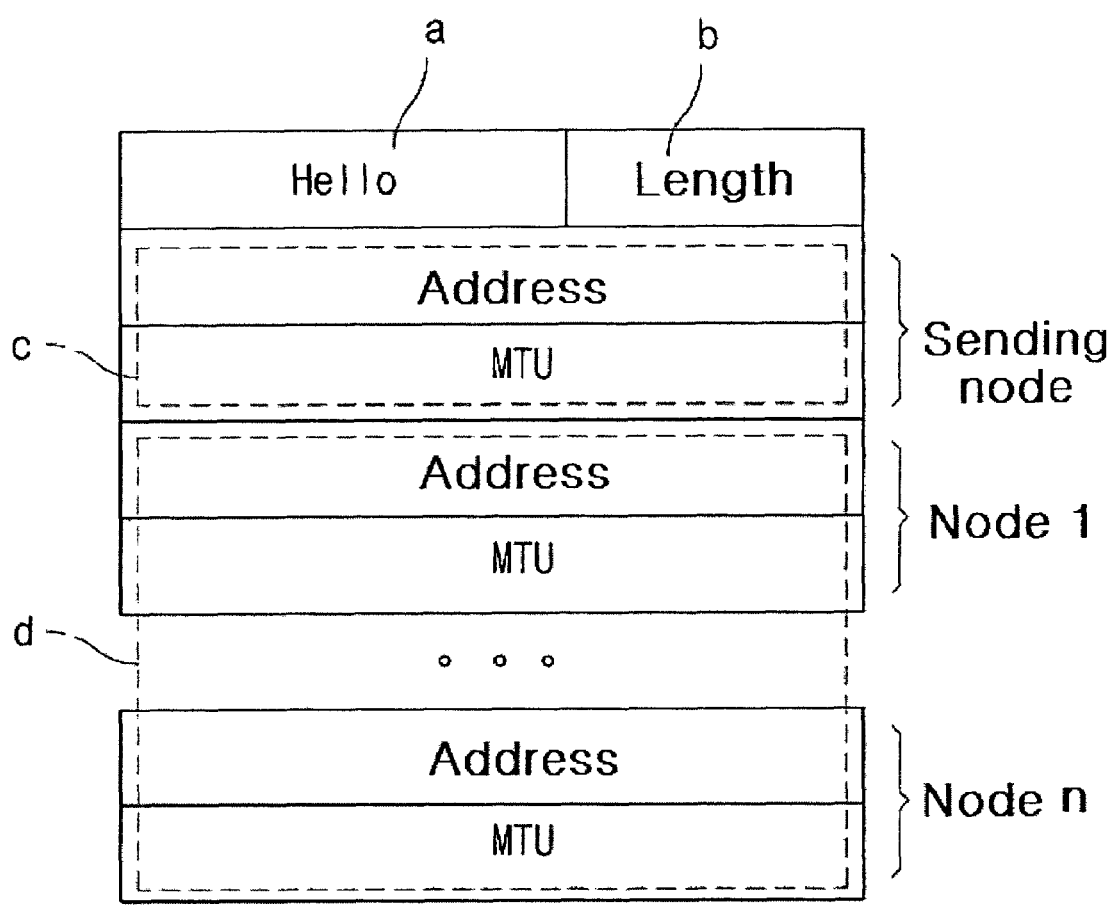
FIG. 7 is a view showing the structure of a hello message applied to the present invention.

FIG. 7 is a view showing the structure of a hello message applied to the present invention.

A hello message is exchanged periodically among adjacent nodes in a communication network. Each node periodically generates a hello message and transmits it to adjacent nodes to notify that the node is connected to the communication network.

To implement the aforementioned method of discovering the path MTU in the ad hoc network consistent with an embodiment of the present invention using a hello message, the hello message applied to the present invention comprises a message type field (a), a message length field (b), a sending node field (c) and a node field (d), as shown in FIG. 7.

In this structure, information representing that a relevant message is a hello message is recorded in the message type field (a) of the hello message, and information on the length of the relevant message is recorded in the message length field (b).

An address and a MTU value of the node transmitting the hello message are recorded in the sending node field (c) of the hello message.

Meanwhile, addresses and MTU values of nodes in the network are recorded in the node field (d) of the hello message.

FIGS. 8 to 11 are flowcharts illustrating a method of discovering a path MTU in an ad hoc network consistent with an embodiment of the present invention.

Figure 8:
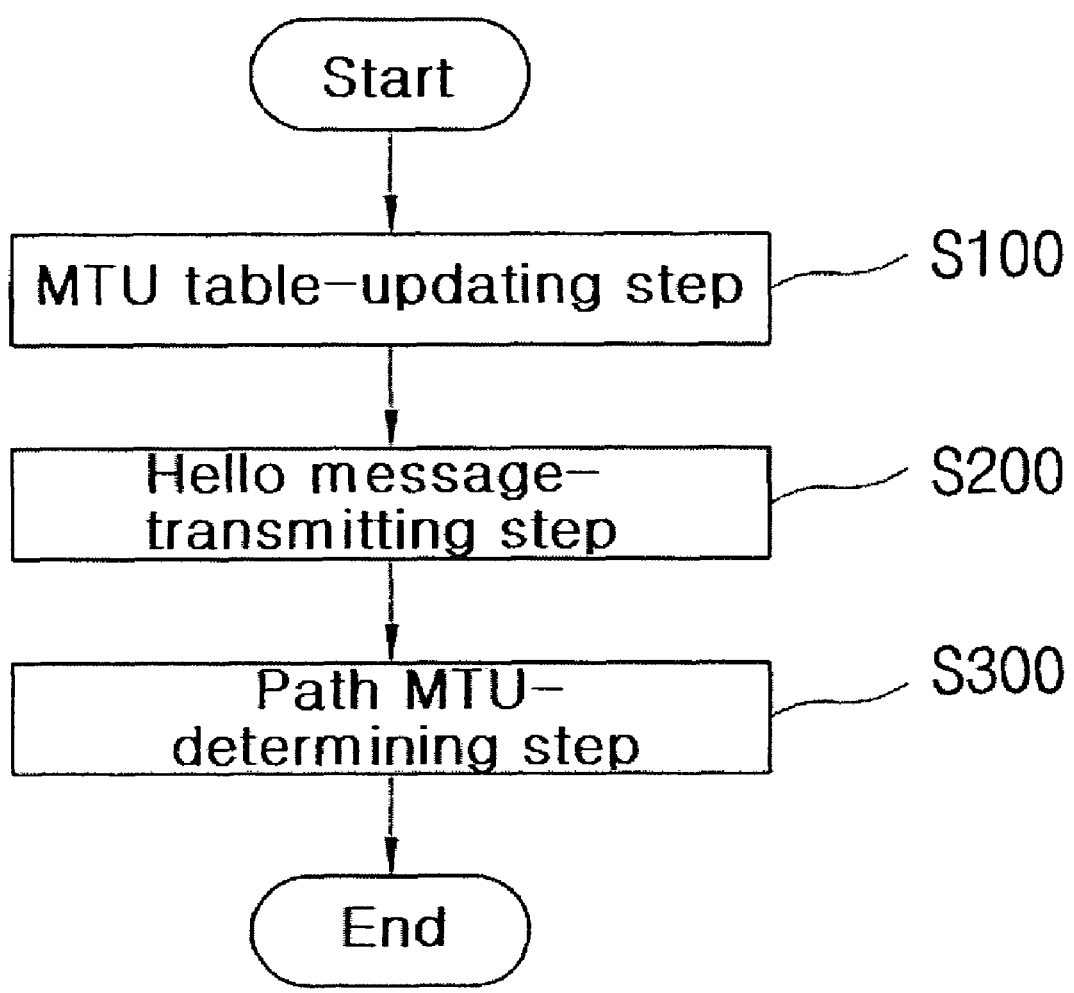
FIGS. 8 to 11 are flowcharts illustrating a method of discovering a path MTU in an ad hoc network consistent with another exemplary embodiment of the present invention.
Figure 9:
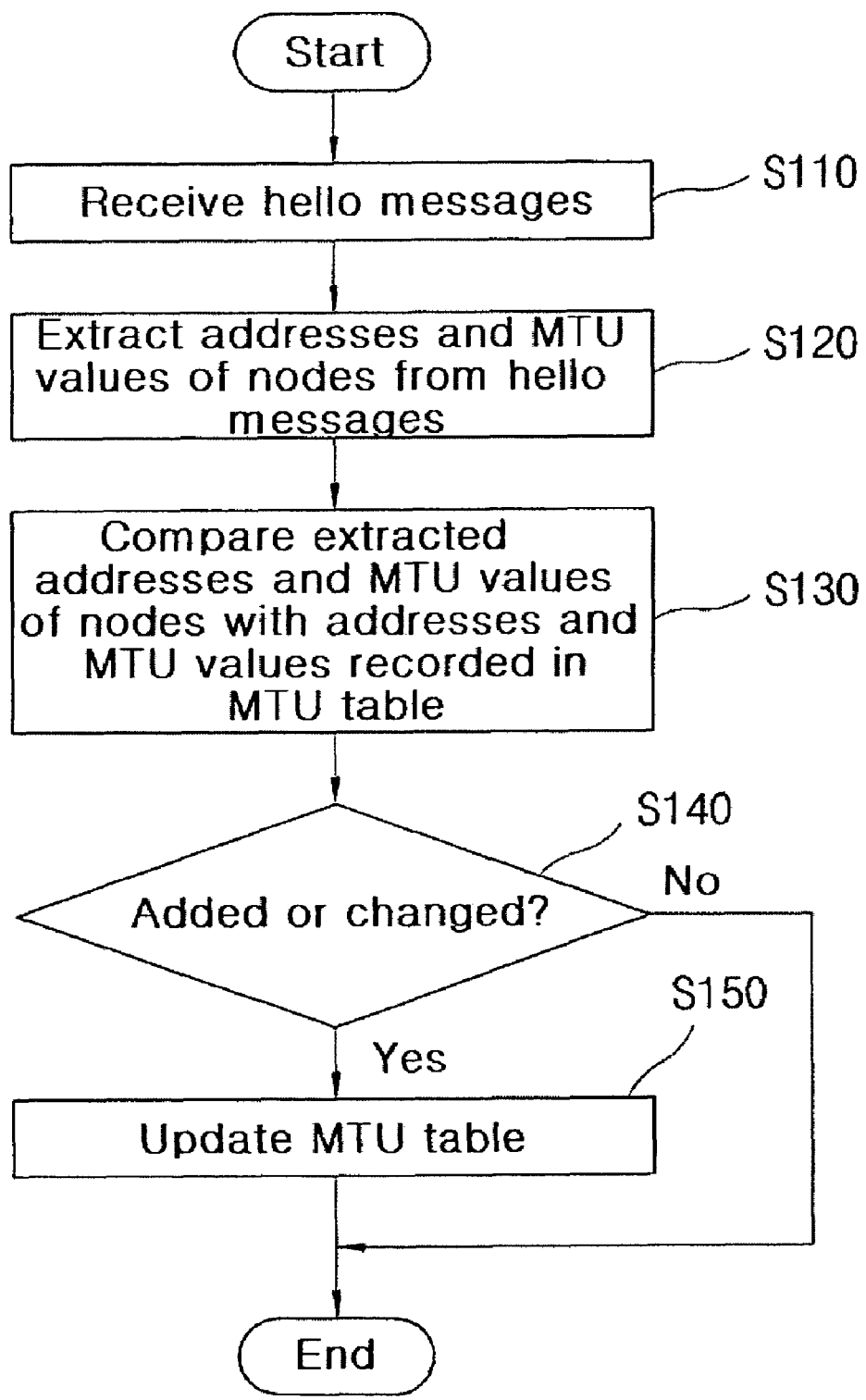

As shown in FIG. 8, the method of discovering the path MTU in the ad hoc network comprises a MTU table updating step of updating a MTU table based on addresses and MTU values of nodes included in a hello message which is received periodically by each node (S100); a hello message transmitting step of periodically generating and transmitting a hello message including addresses and MTU values of nodes stored in the MTU table (S200); and a path MTU determining step of extracting MTU values of nodes on a transmission path from the MTU table upon transmission of a data packet and determining one of the extracted MTU values as the path MTU (S300).

In the MTU table updating step S100 described above, as shown in FIG. 9, if a hello message is received from each adjacent node (S110), addresses and MTU values of the node, which has transmitted the hello message, and the nodes present in the network are extracted after the contents of the received hello message have been analyzed (S120).

Then, the addresses and MTU values of nodes extracted in step S120 and the addresses and MTU values of nodes recorded in the MTU table of the node which has received the hello message are compared with each other (S130), and it is determined whether there are any addresses and MTU values of nodes to be added or changed (S140).

If so, the MTU table is updated based on the addresses and MTU values of nodes extracted in step S120 (S150).

For example, assuming that in tan MTU table of a receiving node B, the MTU value of node A is 6 and the MTU value of node C is 4, if receiving node B receives a hello message from a sending node C in which the MTU value of sending node C is 4 and the MTU values of nodes A, B and D are 5, 5 and 7, respectively, receiving node B adds the address and MTU value of node D to its own MTU table and changes the MTU value of node A to 5 as included in the received hello message.

Figure 10:
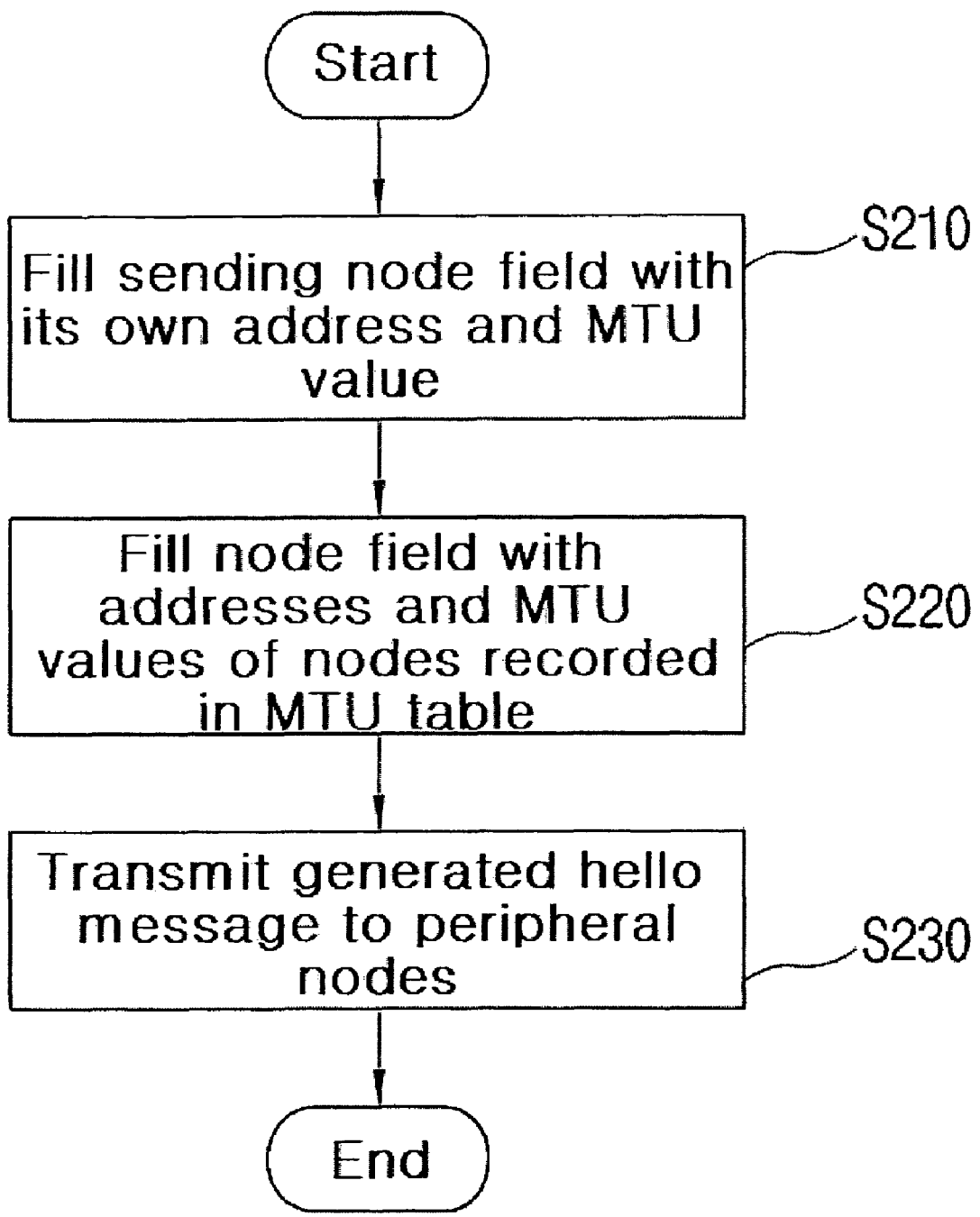

Further, as shown in FIG. 10, in hello message transmitting step S200, a node that intends to send a hello message records its own address and MTU value in the sending node field (c) of the hello message to be sent (S210), and then records addresses and MTU values of other nodes present in the network in the node field 40 of the hello message based on the MTU table (S220).

Thereafter, the hello message generated through steps S210 and S220 is sent to the peripheral nodes (S230).

Figure 11:
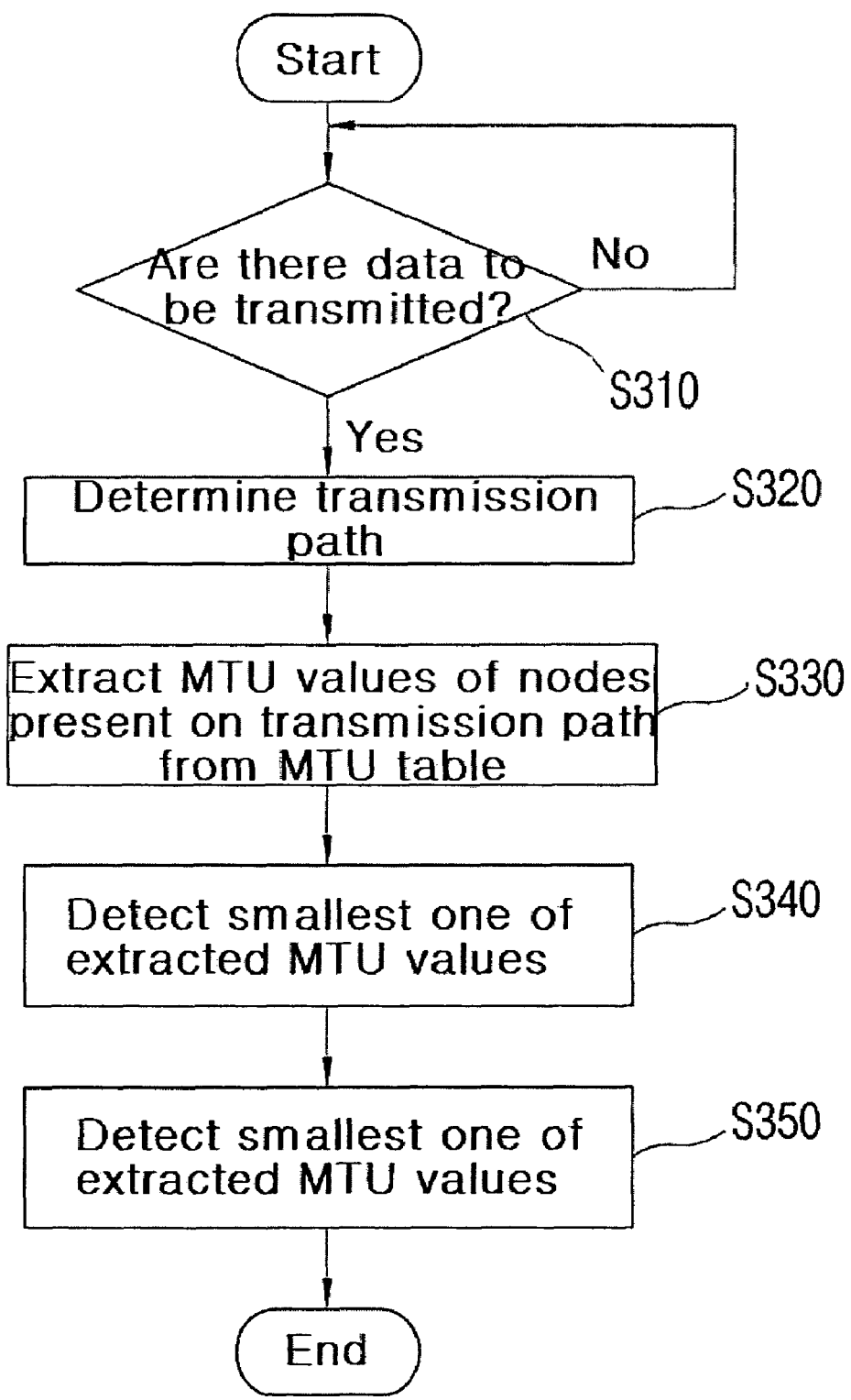

As shown in FIG. 11, in path MTU determining step S300, it is determined whether any data to be transmitted exists (S310). If there is data to be transmitted, the sending node determines a transmission path from the sending node to a receiving node based on a routing table (S320).

Then, MTU values among nodes present in the transmission path, which has been determined in step S320, are extracted from the MTU table (S330).

The smallest MTU value of the extracted MTU values is then detected (S340), and the detected MTU value is determined as the path MTU value from the sending node to the receiving node (S350).

After the path MTU value is thus determined, the sending node transmits a data packet based on the determined path MTU value.

Hereinafter, a method of discovering a path MTU in an ad hoc network consistent with an exemplary embodiment of the present invention will be described with reference to FIGS. 12 and 13.

Figures 12, 13:
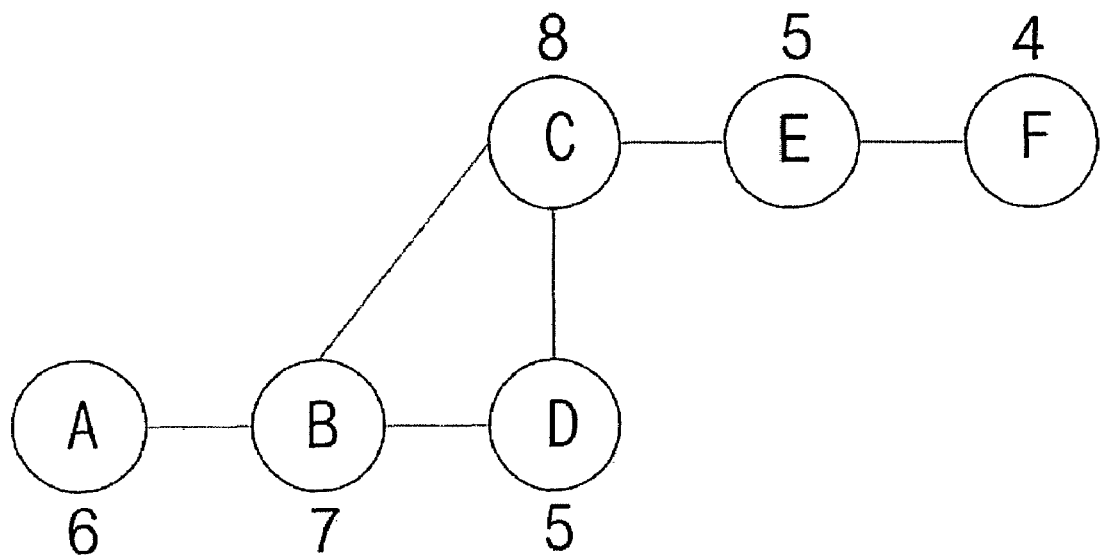
FIGS. 12 and 13 are views explaining a method for discovering a path MTU in an ad hoc network consistent with an exemplary embodiment of the present invention.

As shown in FIG. 12, it is assumed that there are six nodes A, B, C, D, E and F in an ad hoc network, which have MTU values of 6, 7, 8, 5, 5 and 4, respectively.

Under this assumption, if hello messages of the respective nodes generated through hello message transmitting step S200 are exchanged among the nodes, addresses and MTU values of other nodes B, C, D, E and F present in the network are recorded in a MTU table of node A in a one-to-one correspondence relationship, as shown in FIG. 13.

Thereafter, if there are any data to be transmitted from node A to node F, node A first determines a transmission path to node F based on a routing table.

For example, if the transmission path is determined as A-B-C-E-F based on the routing table, node A extracts the MTU values of 6, 7, 8, 5 and 4 of nodes A, B, C, E and F, which are present on the transmission path, from its own MTU table.

Then, the smallest value, e.g. 4, of the extracted MTU values 6, 7, 8, 5 and 4 is determined as a path MTU value.

Thereafter, the sending node A changes the size of the data packet to 4 based on the path MTU value determined as 4, and then transmits the changed data packet via intermediate nodes B, C and E to node F.

Consistent with the system and method for discovering the path MTU in the ad hoc network of the present invention as described above, before a sending node transmits a data packet, MTU values of nodes present on a transmission path are extracted from a MTU table that has been constructed by hello messages exchanged periodically among the nodes in the network, and the smallest value of the extracted MTU values is determined as a path MTU. Thus, there is an advantage in that the path MTU can be discovered without the use of additional wireless resources prior to transfer of the data packet.

As discussed above, since the path MTU is discovered prior to the transfer of the data packet and the data packet is transferred based on the discovered path MTU, there is no retransmission of the data packet due to a packet-size notifying message as in the related art. Thus, there is an advantage in that performance of the network can be improved.

Although the present invention has been described in connection with the exemplary embodiments illustrated in the drawings, it will be apparent to those skilled in the art that various modifications and changes can be made thereto without departing from the spirit and scope of the present invention defined by the appended claims. Therefore, various changes to the embodiments of the present invention will fall within the scope of the invention.

What is claimed is:

1. A system for discovering a path maximum transfer unit (MTU) in an ad hoc network, comprising:
   a path MTU-determining unit operable to extract MTU values of nodes present on a transmission path from a MTU table constructed of MTU values of nodes present in the ad hoc network by using hello messages, and determining one of the extracted MTU values as a path MTU value,
   a MTU table-managing unit operable to update the MTU table based on addresses and MTU values of nodes included in the hello messages wherein the hello messages are received periodically; and a hello message-transmitting unit operable to insert the addresses and MTU values of nodes stored in the MTU table into each of the hello messages, and periodically transmitting the resultant hello messages, wherein when updating the MTU table:

the path MTU-determining unit analyzes the received hello messages and extracts the addresses and MTU values of both the nodes transmitting the hello messages and the nodes present in the network; and the MTU table-managing unit compares the extracted addresses and MTU values with the addresses and MTU values of nodes stored in the MTU table and determines whether there are any addresses and MTU values of nodes that should be added or changed; and the MTU table-managing unit updates the MTU table based on the extracted addresses and MTU values, if it is determined that there are any addresses and MTU values of nodes which should be added or changed.

2. The system as claimed in claim 1, wherein each of the hello messages comprises:

a message type field on which information on the type of message is recorded;

a message length field on which information on the length of message is recorded; and a node field on which addresses and MTU values of the nodes present in the network are recorded.

3. The system as claimed in claim 2, wherein the node field comprises a sending node field on which an address and a MTU value of a node transmitting a hello message are recorded.

4. The system as claimed in claim 2, wherein the addresses and the MTU values of the nodes present in the network are stored in the MTU table.

5. A method of discovering a path maximum transfer unit (MTU) in an ad hoc network, comprising:

determining an MTU path by extracting MTU values of nodes present on a transmission path from a MTU table constructed of MTU values of nodes present in the network by using hello messages, and determining one of the extracted MTU values as a path MTU value, updating the MTU table based on addresses and MTU values of nodes included in the hello messages wherein the hello messages are received periodically; and inserting the addresses and MTU values of nodes stored in the MTU table into each of the hello messages, and periodically transmitting the resultant hello message, wherein updating the MTU table comprises:

analyzing the received hello messages and extracting the addresses and MTU values of both the nodes transmitting the hello messages and the nodes present in the network;

comparing the extracted addresses and MTU values with the addresses and MTU values of nodes stored in the MTU table and determining whether there are any addresses and MTU values of nodes that should be added or changed; and updating the MTU table based on the extracted addresses and MTU values, if it is determined that there are any addresses and MTU values of nodes which should be added or changed.

6. The method as claimed in claim 5, wherein each of the hello messages comprises:

a message type field on which information on the type of message is recorded;

a message length field on which information on the length of message is recorded; and a node field on which addresses and MTU values of the nodes present in the network are recorded.

7. The method as claimed in claim 6, wherein the node field comprises a sending node field on which addresses and MTU values of nodes transmitting the hello messages are recorded.

8. The method as claimed in claim 6, wherein the addresses and the MTU values of the nodes present in the network are stored in the MTU table.

9. The method as claimed in claim 5, wherein determining the MTU path comprises:

determining the transmission path based on a routing table, if there is any data to be transmitted;

extracting MTU values of the nodes present on the transmission path from said MTU table; and detecting the smallest MTU value of the extracted MTU values, and determining the detected MTU value as the path MTU value from a sending node to a receiving node.

10. The method as claimed in claim 5, wherein transmitting the hello message comprises:

recording the addresses and MTU values of the nodes transmitting the hello messages on a sending node field of each of the hello messages;

recording the addresses and MTU values of the nodes present in the network on the node field by referring to the MTU table; and transmitting the generated hello messages to adjacent nodes.

* * * * *